United States Patent [19]

McKee et al.

[11] 3,950,080

[45] Apr. 13, 1976

[54] REAR VIEW MIRROR ACTUATING DEVICE

[76] Inventors: Clyde M. McKee, 22175 Bernard St., Taylor, Mich. 48180; Ward Scott, 429 Rochdale Drive, Rochester, Mich. 48063

[22] Filed: Nov. 25, 1974

[21] Appl. No.: 526,795

[52] U.S. Cl. .................................. 350/302; 350/307
[51] Int. Cl.² .......................................... G02B 5/08
[58] Field of Search .......... 74/501 M; 350/289, 299, 350/302, 303, 304, 307

[56] References Cited
UNITED STATES PATENTS

| | | | |
|---|---|---|---|
| 2,854,892 | 10/1958 | Stark | 350/307 |
| 3,166,630 | 1/1965 | Esslinger | 350/307 X |
| 3,208,343 | 9/1965 | Prochnow | 350/302 |
| 3,469,901 | 9/1969 | Cook et al. | 350/289 |
| 3,761,164 | 9/1973 | McKee et al. | 350/307 |

Primary Examiner—John K. Corbin
Assistant Examiner—F. L. Evans
Attorney, Agent, or Firm—Gifford, Chandler & Sheridan

[57] ABSTRACT

A mirror actuating device for automatically changing the orientation of side-view mirrors which are movably mounted to a vehicle, such as a semi-truck tractor, in response to the relative positions of the tractor and a trailer being towed by the tractor to provide a variable field of view to a driver of the tractor through the mirrors. The actuating device has two actuating plates slidably mounted to the tractor, cables interconnecting the actuating plates to the mirrors, an actuating pin attached to the trailer, and an arm pivotally mounted between its ends to the tractor and having one end connected to the actuating plates and another end connected to the actuating pin. The necessary operating connection between the actuating plates on the tractor and the pin carried by the trailer is automatically made when the tractor and trailer are hooked together in the normal manner. As the tractor-trailer combination negotiates a turn the trailer assumes various angles with respect to the tractor and in doing so the mirrors mounted on the tractor are suitably moved by the actuating device to produce a field of view which is substantially clear of the trailer.

15 Claims, 6 Drawing Figures

REAR VIEW MIRROR ACTUATING DEVICE

BACKGROUND OF THE INVENTION

I. Field of the Invention

The present invention relates generally to externally mounted rear view mirrors, commonly called side view mirrors, for vehicles, such as tractor-trailer combinations. In particular, the invention relates to a device automatically connected upon connection of the tractor and trailer and operates to automatically control the position of movably mounted mirrors in response to the angular relationship between the tractor and the trailer being towed by the tractor.

II. Description of the Prior Art

A problem associated with the maneuverability of articulated vehicles, such as tractor-trailer combinations is the difficulty in quickly and conveniently determining the location of the rear end of the trailer. This problem is particularly difficult when the trailer is long and when a right hand turn is being negotiated. This is because the mirrors must necessarily be adjusted for straight-ahead driving and therefore in a right-hand turning maneuver the right hand mirror will be directed against the side of the trailer and the left hand mirror will be directed outwardly away from the trailer.

Likewise, when a left hand turn is being negotiated, the left hand mirror is directed against the side of the trailer and the right hand mirror is directed outwardly away from the trailer. While this condition is not as critical as the right hand turn situation, it nevertheless is undesirable because it requires the driver of the tractor to turn around in his seat, or at least to swivel his head through a large angle which completely diverts his attention from events which are occurring at the front of the tractor, his head being turned to such a degree that these events may even be outside of his peripheral vision.

A solution to this problem is to make the mirrors move in response to the orientation of the trailer relative to the tractor such that the field of view through the mirrors will include the rear portion of the trailer when making turns.

Prior art devices have been directed to this problem, but have been of minor success because of their complexity and impracticability.

One problem that has not been satisfactorily solved is as follows. The most accurate response between movement of the trailer and the mirrors is obtained when means are provided on both the tractor and trailer and are connected together to thereby sense changes in the relative positions of the tractor and trailer. Heretofore such means have been very cumbersome and have required additional time and difficulty in making the necessary connections.

SUMMARY OF THE PRESENT INVENTION

The present invention provides an actuating device automatically connected together upon connection of the tractor and trailer and operable to control the orientation of mirrors movably mounted to the tractor in response to the relative position of the trailer to the towing tractor to provide a variable field of view through the mirrors as the situation dictates.

The device comprises a mounting plate disposed beneath the tractor fifth wheel element of a trailer hitch mechanism, two plates mounted for slidable movement on the mounting plate in the longitudinal direction of the tractor, cables interconnecting each of the slidably mounted plates to a different mirror, an actuating pin attached to the trailer king pin element of the trailer hitch mechanism, and an arm pivotally mounted between its ends to the mounting plate and having one end slidably connected in the slidably mounted plates and another end automatically and operatively engaged with the actuating pin upon connection of the tractor and the trailer.

As the tractor-trailer combination negotiates a turning maneuver, the tractor and trailer pivot with respect to each other about the axis of the trailer king pin. In so doing, the actuating pin causes the arm to pivot about its pivot mounting which, in turn, causes a selected one of the slidably moutned plates to move longitudinally rearwardly of the tractor on the mounting plate. This rearward movement of the slidably mounted plate axially pulls the cable attached thereto and causes the mirror attached to the other end of the cable to also pivot in a direction generally outwardly away from the tractor, thus, changing the field of view through the mirror to include the rear end of the trailer.

BRIEF DESCRIPTION OF THE DRAWINGS

The preferred embodiment of the invention is illustrated in the accompanying drawings, where like numerals refer to like parts throughout the several views and in which.

DETAILED DESCRIPTION OF A PREFERRED EMBODIMENT

Figure 1:
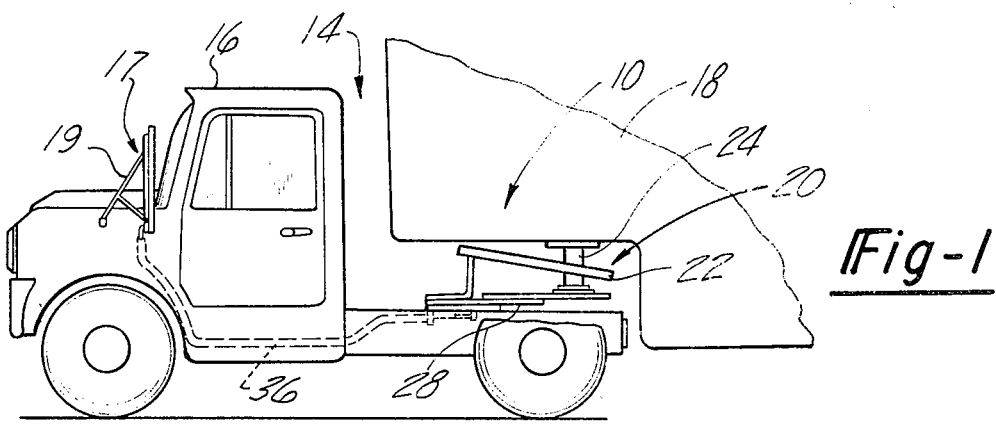
FIG. 1 is a fragmentary side view of a truck having the present invention installed thereon.

Now referring to the drawings for a more detailed description of the present invention, the preferred embodiment thereof is illustrated in FIGS. 1, 3, 4 and 6 as comprising an actuating device, generally denoted as 10, mounted to a tractor-trailer combination vehicle, generally denoted as 14. The tractor-trailer combination consists of a tractor 16 for pulling a trailer 18. Exteriorly mounted mirrors 17, commonly called rear view mirrors, are pivotally mounted by brackets 19 on the left hand side and right hand side of the tractor 16 to enable the driver of the tractor to have a field of view to the rear toward the trailer 18 without having to swivel his head completely around.

Figure 2:
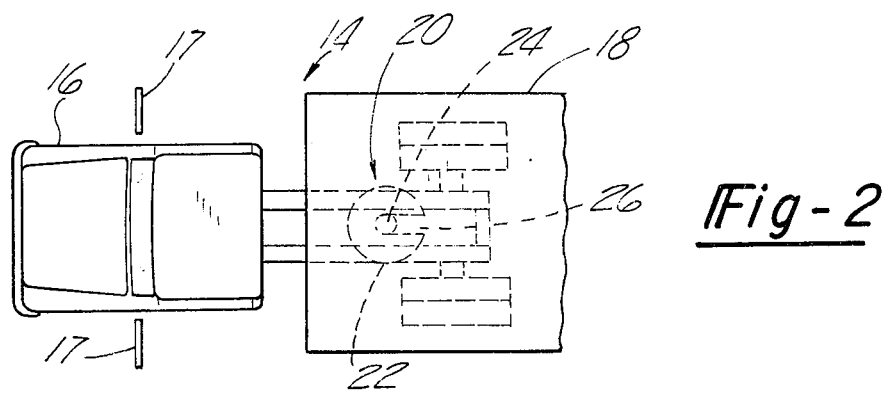
FIG. 2 is a top view of the truck of FIG. 1 showing the tractor and trailer in axial alignment.

The tractor 16 and trailer 18 include a hitch 20 to connect them together for articulated motion in the horizontal plane so that the combination vehicle 14 may negotiate turns. As can best be seen in FIG. 4, the hitch 20 generally includes a fifth wheel 22 mounted to the tractor 16 by, for example, a bracket 23 and a king pin 24 mounted to the trailer 18 which mates with the fifth wheel 22 through an opening 26 (FIG. 2) therein. This type of hitch is well known and, therefore, will not be further described.

Figure 3:
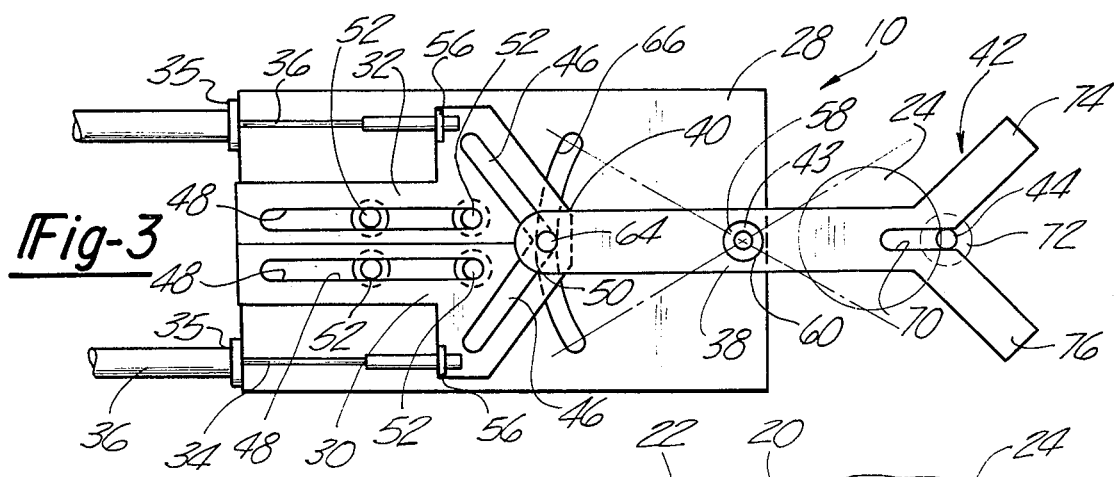
FIG. 3 is a bottom view of an assembly of the present invention as it appears when the tractor and trailer are in axial alignment.
Figure 4:
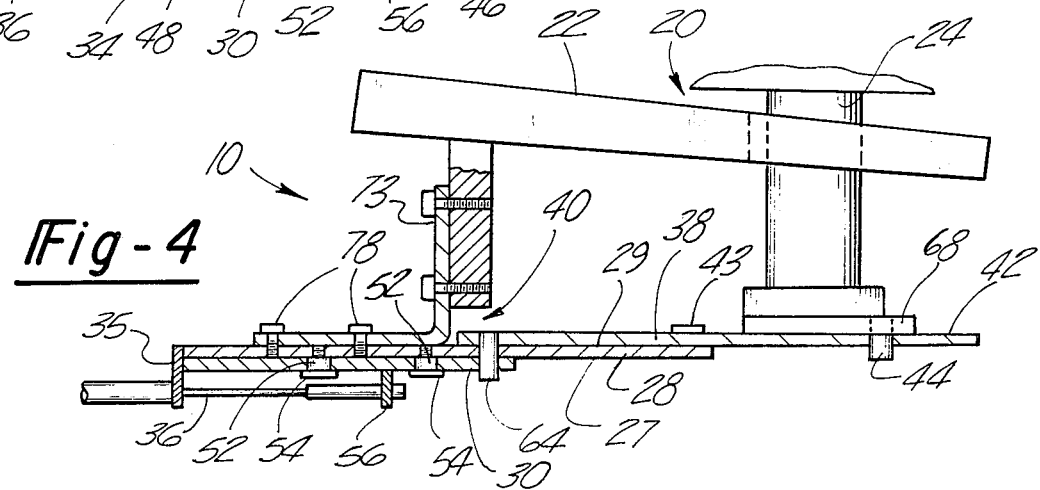
FIG. 4 is a side view of the assembly of FIG. 3.

Referring particularly to FIGS. 3 and 4, the actuating device 10 comprises a mounting plate 28 attached to the tractor 16 in the vicinity of and below the fifth wheel 22. Actuating means, such as a first actuating plate 30 and a second actuating plate 32 are slidably mounted in juxtaposition to each other to the bottom surface 27 of the mounting plate 28 for independent movement in the longitudinal direction of the tractor 16. As can best be seen in FIG. 3 the actuating plates 30 and 32 are generally L-shaped with the stem portions adjacent and the leg portions extending in opposite directions. Connecting means, such as a first cable 34 and a second cable 36 interconnect the leg portions of the first and second actuating plates 30, 32, respectively, to the left hand and right hand pivotally mounted mirrors 17, respectively. An arm 38 having ends 40, 42 is disposed on the top surface 29 of the mounting plate 28 and has a pivotal mounting, generally denoted as 43, between its ends 40, 42 to provide pivotal movement of the arm 38 in the horizontal plane. The arm 38 is operatively associated with the first and second actuating plates 30, 32 at its end 40. Actuating means, such as actuating pin 44 is connected to the king pin 24 to depend therefrom to operatively associate with the end 42 of the arm 38.

The first and second actuating plates 30, 32 are substantially identical, being mirror images of each other. Therefore, for the sake of clarity, the same components of each are referred to by the same reference numerals. As can best be seen in FIG. 3, the first and second actuating plates 30, 32 are each generally L-shaped and each includes a first elongated slot 46 extending obliquely to the longitudinal axis of the tractor 16. Each first slot slot 46 has an end 50 open to the interface between the first and second actuating plates 30, 32. In addition, each actuating plate 30, 32 has an elongated second slot 48 disposed generally parallel to the longitudinal axis of the tractor 16.

FIG. 3 illustrates the actuating device 10 in its configuration corresponding to longitudinal alignment of the tractor 16 and trailer 18. In this configuration, the two juxtaposed first and second actuating plates 30, 32 are symmetrically disposed relative to each other such that the open end 50 of the first slot 46 in the first actuating plate 30 communicates with the open end 50 of the first slot 46 in the second actuating plate 32. The first slot 46 in the first actuating plate 30 and the first slot 46 in the second actuating plate 32 cooperate to form a generally V-shape slot with the open ends 50 at the apex.

The actuating plates 30, 32 are each slidably mounted to the mounting plate 28 by two longitudinally spaced apart bearing pins 52. The spacing between each set of bearing pins 52 associated with each actuating plate is smaller than the length of the second slot 48. Further, each bearing pin 52 is attached at one of its ends to the mounting plate 28 and extends downwardly therefrom. The other end of each bearing pin 52 has an enlarged head 54 (FIG. 4) which is spaced from the bottom surface 27 of the mounting plate 28 a distance approximately equal to the thickness of the actuating plates 30, 32. The portion of the bearing pins 52 between their head 54 and the bottom surface 27 of the mounting plate 28 is slidably received in the elongated second slot 48 of the actuating plates 30, 32. Again, when the actuating device 10 is in the configuration illustrated in FIG. 3, the rearmost bearing pin 52 of each set of two longitudinally spaced bearing pins abuts the rearmost end of the elongated second slot 48 in the respective actuating plate 30, 32 to act as a stop.

As can best be seen in FIG. 4, each of the first and second actuating plates 30, 32 has a downwardly extending mounting flange 56. The first cable 34 is connected at one end to the pivotally mounted right hand mirror 17 and at the other end to the flange 56 of the first actuating plate 30. The second cable 36 is likewise connected at one end to the pivotally mounted left-hand mirror 17 and at the other end to the flange 56 of the second actuating plate 32. These connections may be made with known standard fasteners, such as a nut received on a threaded end of the cables.

The first and second cables 34, 36 should be a shielded type, such as Bowden type cables, for protection from the elements and foreign objects. When a shielded cable is used, downwardly extending abutment flanges 35 are provided at the front edge of the mounting plate 28 to prevent the shield from moving as the cable element is moved.

Referring again to FIG. 3, the arm 38 is pivotally mounted to the mounting plate 28 rearwardly of the first and second actuating plates 30, 32, i.e., toward the trailer 18. The pivotal mounting 43 comprises a hole 58 in the arm 38 between its ends 40, 42 and a pivot pin 60 slidably received through the hole 58. The pivot pin 60 preferably has one end connected to the mounting plate 28 and extends upwardly therefrom. The other end of the pivot pin 60 has an enlarged head which is spaced from the top surface 29 of the mounting plate 28 a distance approximately equal to the thickness of the arm 38. The portion of the pivot pin 60 between the head and the top surface 29 of the mounting plate 28 is slidably received in the hole 58.

The operative association of the arm 38 at its end 40 with the first and second actuating plates 30, 32 comprises a first pin 64 connected at one end to the arm 38 near its end 40 and having its other end projecting downwardly and slidably received in the first slots 46 of the first and second actuating plates 30, 32. An arcuately shaped clearance slot 66 (FIG. 3) having its center of curvature coincident with the center of the pivot mounting 43 of the arm 38 is provided in mounting plate 28 to allow the first pin 64 to project through the mounting plate 28 into the first slots 46 in the first and second actuating plates 30, 32.

The actuating pin 44 is connected at one end to the king pin 24 of trailer 18 by, for example, an actuating pin mounting plate 68 (FIG. 4) which is in turn attached to the king pin 24 by bolts (not shown). The other end of the actuating pin 44 projects downwardly from the actuating pin mounting plate 68 to automatically and operatively engage the end 42 of the arm 38 when the tractor 16 and trailer 18 are connected together.

Referring again to FIG. 3, the operative engagement of the other end of the actuating pin 44 with the end 42 of the arm 38 comprises a third slot 70 disposed axially of the arm 38 and having an end 72 open to the end 42 of the arm 38. In addition, two rearwardly diverging extensions 74, 76 are connected on opposite longitudinal sides of the third slot 70 at the end 42. These extensions project rearwardly and outwardly of the open end 72. The actuating pin 44 is slidably received in the third slot 70 through the open end 72 and the diverging extensions 74, 76 function as guides to properly orient the third slot 70 with the actuating pin 44 as it is being inserted into the slot 70.

In the preferred embodiment, and as can be best seen in FIG. 4, the mounting plate 28 of the actuating device 10 is connected to the same bracket 23 to which the fifth wheel 22 is connected. This connection of the mounting plate 28 may be by any convenient means such as bolts 78.

Figure 5:
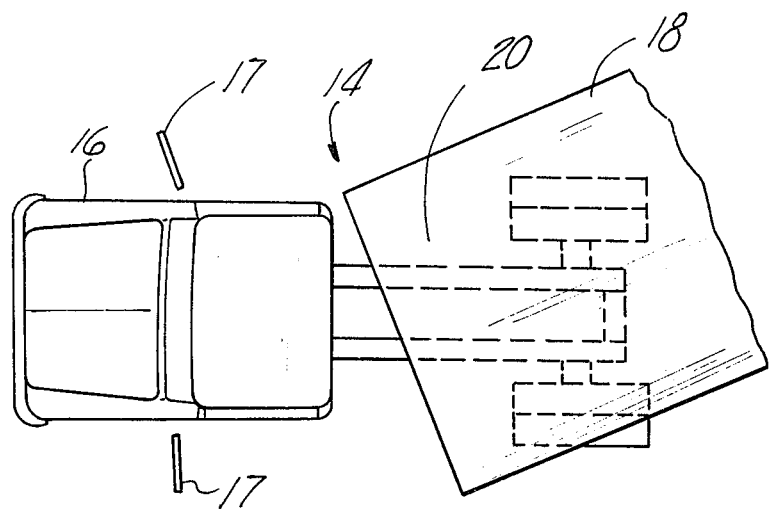
FIG. 5 is a top view of a truck during a right-hand maneuver wherein the tractor and trailer are disposed at an angle relative to each other.
Figure 6:
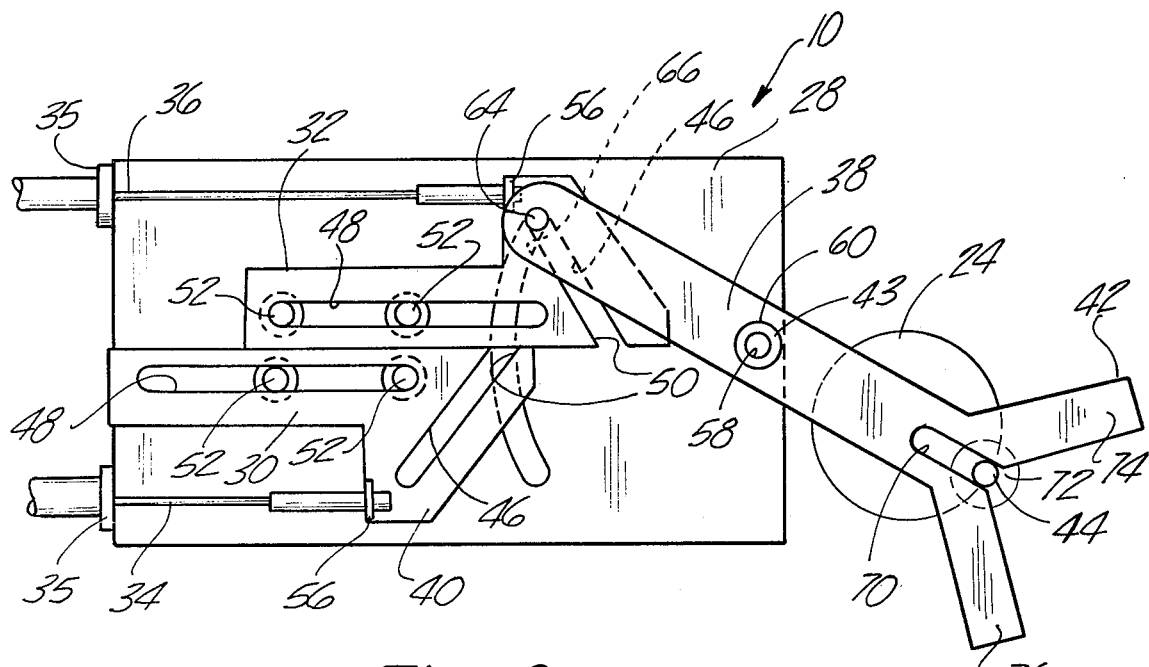
FIG. 6 is a bottom view of the assembly of the present invention as it appears when the tractor and trailer are in a right-hand maneuver.

As the tractor-trailer combination negotiates a right hand turn, such as that illustrated in FIG. 5, the actuating device 10 assumes the configuration illustrated in FIG. 6. The actuating pin 44 on the king pin 24 is displaced to the right side of the longitudinal axis of the tractor 16 or toward the lower portion as viewed in FIG. 6. This causes the arm 38 to pivot clockwise as viewed in FIG. 6, which in turn causes the pin 64 connected to the end 40 of the arm 38 to be displaced to the left side of the longitudinal axis of the tractor 16 or toward the top as viewed in FIG. 6. As the first pin 64 is so displaced, it is forced into the slot 46 of the actuating plate 32. Because the slot 46 is obliquely disposed to the longitudinal axis of the tractor 16 in a direction toward the tractor 16, the actuating plate 32 is forced to slide longitudinally rearwardly on the mounting plate 28 toward the trailer 18. In so doing, the plate 32 axially pulls the cable 34 rearwardly. Because the other end of the cable 34 is connected to the right hand mirror 17, this rearward movement of the cable 34 is translated to the right hand mirror 17. The connection of the cable 34 to the right hand mirror 17 is such as to cause the right hand mirror 17 to pivot outwardly away from the tractor 16 as illustrated in FIG. 5.

The degree to which the first pin 64 is forced or displaced into the slot 46 of the actuating plate 32, and, therefore, the degree to which the right hand mirror 17 pivots, is a function of the degree of the turning radius or maneuver being negotiated by the tractor-trailer combination 14.

The movements of the various components of the actuating device 10 during a left hand maneuver is identical to the above described movements, but in the opposite direction, and instead of the actuating plate 32 being forced rearwardly, the actuating plate 30 is forced rearwardly to actuate the cable 36 and the left hand mirror 17.

During a right hand maneuver, only the first actuating plate 32 and the right hand mirror 17 move, the second actuating plate 30 and left hand mirror 17 remaining stationary. Likewise, during a left hand maneuver the actuating plate 32 and the right hand mirror 17 remain stationary, and the actuating plate 30 and the left hand mirror 17 move.

It should be clear that the actuating pin 44 is automaticallly received in the slot 70 through its open end 72 when the trailer 18 is connected to the tractor 16. Likewise, the pin 44 is automatically disengaged from the slot 70 through its open end 72 when the trailer 18 is disconnected from the tractor 16. Thus no special connections need be made; the mirror actuating system being automatically engaged and disengaged upon engagement and disengagement of the tractor and trailer.

The foregoing detailed description is given primarily for clearness of understanding and no unnecessary limitations should be understood therefrom, for modifications will be obvious to those skilled in the art upon reading this disclosure.

We claim:

1. An actuating device to automatically control the orientation of mirrors movably mounted on a vehicle in response to the relative positions of the vehicle and a trailer being towed by the vehicle to provide a variable field of view through the mirrors to a driver of the vehicle, said device comprising:

mirror actuating means slidably mounted to the vehicle for movement in the longitudinal direction of the vehicle;

connection means connecting said mirror actuating means to the mirrors;

an arm pivotally mounted to the vehicle and operatively engaged with said mirror actuating means; and actuating means attached to the trailer and automatically operatively engaging said arm when said trailer is connected to said vehicle for towing of said trailer by said vehicle, wherein said actuating means automatically operatively disengages from said arm upon the disconnection of said trailer from said vehicle, said actuating means being operable to pivot said arm in a direction and to a degree depending upon the angle existing between said vehicle and trailer whereby, as the vehicle negotiates a turn, the trailer being towed by the vehicle assumes an angle with respect to the vehicle, and in so doing said actuating means causes said arm to pivot about its pivotal mounting which in turn causes said mirror actuating means to move in the longitudinal direction of the vehicle, thus, moving said connection means interconnecting said mirror actuating means and the mirrors thus moving the mirrors to a position depending upon the direction and degree of turning of said vehicle.

2. An actuating device as defined in claim 1, wherein said mirror actuating means comprises:

a first actuating plate mounted to the vehicle for movement in the longitudinal direction of the vehicle;

a second actuating plate disposed in juxtaposition to said first plate mounted to the vehicle for movement in the longitudinal direction of the vehicle;

means defining a first slot in said first plate, said first slot having one end open to the interface between said first and second juxtaposed actuating plates;

means defining a first slot in said second plate, said first slot having one end open to the interface between said first and second juxtaposed actuating plates; and said one end of said pivotally mounted arm engaging said first slot in said first plate and said first slot in said second plate.

3. An actuating device as defined in claim 2, wherein said connection means comprises:

a first cable connected at one of its ends to said first actuating plate and at the other of its ends to one of the mirrors; and a second cable connected at one of its ends to said second actuating plate and at the other of its ends to one of the mirrors.

4. An actuating device as defined in claim 2, further comprising:

a first pin connected near one end of said arm, and extending therefrom, which first pin slidably engages in said first slot in said first plate and in said first slot in said second plate; and means defining a third slot having an axis disposed longitudinally of said arm at the other end of said arm, said third slot having an end open to the other end of said arm to slidably receive said actuating means.

5. An actuating device as defined in claim 4, wherein said actuating means comprises an actuating pin attached to the trailer and being slidably receivable in said third slot in said arm.

6. An actuating device as defined in claim 5 in which the vehicle includes a fifth wheel and the trailer includes a king pin which cooperate for form an articulated hitch by which the vehicle is attached to the trailer for towing, said device further comprising:
 a mounting plate attached to the vehicle beneath the fifth wheel;
 means to slidably connect said first actuating plate to said mounting plate for movement in the longitudinal direction of the vehicle;
 means to slidably connect said second actuating plate to said mounting plate for movement in the longitudinal direction of the vehicle;
 means to pivotally mount said arm to said mounting plate for pivotal movement in a generally horizontal plane of the vehicle; and
 said actuating pin being attached to the trailer king pin.

7. An actuating device as defined in claim 5, wherein said other end of said arm has two diverging extensions, each disposed on a different longitudinal side of said third slot said diverging extensions act to guide said actuating pin into said third slot.

8. An actuating device as defined in claim 3, wherein:
 said first actuating plate is generally L-shaped;
 said second actuating plate is generally L-shaped;
 said first and second plates are disposed in juxtaposition such that the stem of said first actuating plate is adjacent the stem of said actuating second plate and the respective legs of the L-shaped extend in opposite directions;
 said first cable is connected to the leg of said first L-shaped actuation plate; and
 said second cable is connected to the leg of said second L-shaped actuating plate.

9. An actuating device as defined in claim 2, wherein:
 said first slot in said first actuating plate extends obliquely to its longitudinal axis of movement in a direction generally away from said one end of said arm which engages said first slot;
 said first slot in said second actuating plate extends obliquely to its longitudinal axis of movement in a direction generally away from said one end of said arm which engages said first slot.

10. An actuating device as defined in claim 6, wherein said means to slidably connect each of said first and second actuating plates to said mounting plate comprises:
 at least two bearing pins spaced a predetermined distance apart in the longitudinal direction of the vehicle, each of said bearing pins being connected at one end to said mounting plate and extending a predetermined distance therefrom; and
 each of said first and second actuating plates have a second slot having an axis extending in the longitudinal direction of the vehicle, said second slot slidably receiving the extending portion of said spaced apart bearing pins.

11. An actuating device as defined in claim 6, wherein said means to pivotally mount said arm to said mounting plate comprises:
 a pivot pin spaced a predetermined distance from said first and second actuating plates in the longitudinal direction of the vehicle toward the trailer, said pivot pin being connected at one end to said mounting plate and extending a predetermined distance therefrom;
 said arm including an aperture between its ends to slidably receive the extending portion of said pivot pin, so that said arm can pivot about said pivot pin in a generally horizontal plane.

12. An actuating device as defined in claim 11, wherein said mounting plate includes an arcuately shaped clearance slot having its center of curvature coincidental with the center of said pivot pin, said first pin extending to engage said first slots in said first and second actuating plates.

13. An actuating device as defined in claim 12, wherein said actuating pin is attached to the king pin of the trailer extending downwardly therefrom and is receivable in said third slot in the other end of said arm.

14. An actuating device as defined in claim 13, wherein said mounting plate is located in a generally horizontal plane beneath the fifth wheel of the trailer.

15. An actuating device as defined in claim 14, wherein:
 said first plate includes a downwardly extending flange to which the one end of said first cable is connected; and
 said second plate includes a downwardly extending flange to which the one end of said second cable is connected.

* * * * *